March 27, 1928.  E. DWIGHT  1,664,390
EDUCATIONAL DEVICE
Filed May 10, 1926
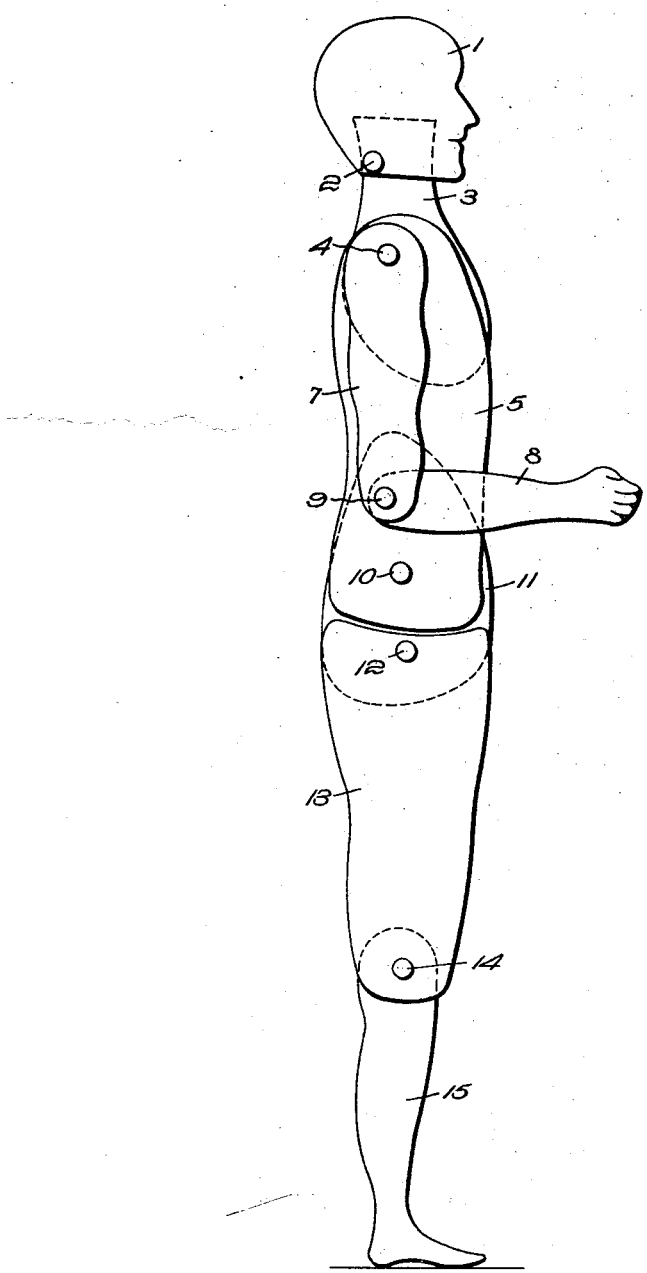
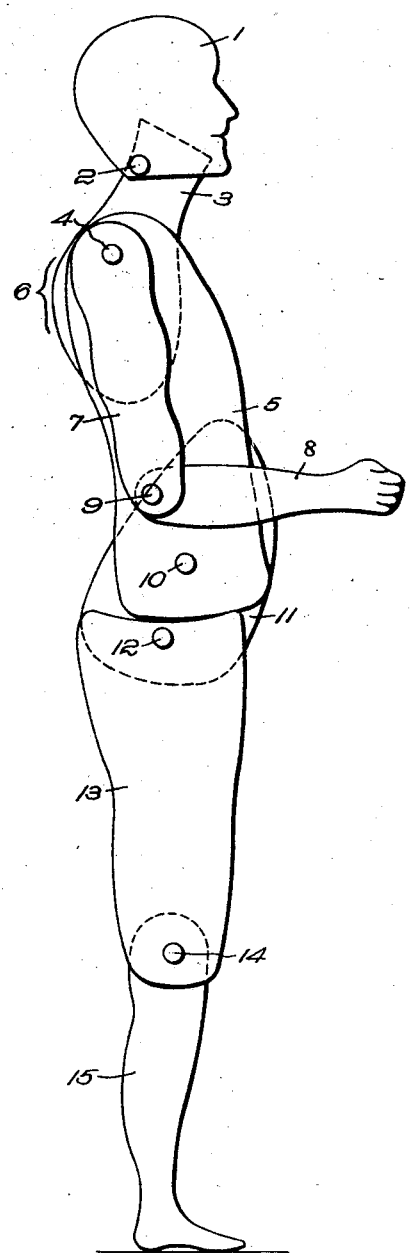
Inventor:
Elizabeth Dwight,
by Emery, Booth, Janney & Varney
Attys.

Patented Mar. 27, 1928.

1,664,390

UNITED STATES PATENT OFFICE.

ELIZABETH DWIGHT, OF BROOKLINE, MASSACHUSETTS.

EDUCATIONAL DEVICE.

Application filed May 10, 1926. Serial No. 108,126.

My invention is an educational device. Said device is employed in explaining, visualizing and teaching correct posturing, particularly in schools and among the young, and to which I have given the name "posture man".

In order that the principle of my invention may be readily understood, I have disclosed one embodiment thereof in the accompanying drawing, wherein—

Fig. 1 shows in side elevation the figure or posture man in perfect posture; and Fig. 2 shows the same, for contrast, in incorrect posture.

The educational device or so-called posture man of my invention is not to be confused with jointed dolls or jointed doll-like toys. It is strictly an educational device, and is intended to visualize or portray, in at least a quasiscientific manner, correct posturing by moving the figure or posture man from one position into the other, and thus emphasize the differences.

It is well established that perfect posturing contributes as much as, and probably more than, any other factor toward perfect health. Therefore, a mechanical device that will teach perfect posturing is of great educational value. The object of the device or posture man is first to demonstrate or visualize perfect posture, namely, with the head up, chin in, chest forward, stomach in, the pelvis pulled up in front and down in back, with the knees just easy and the weight of the entire body a little forward, and the second and equally important object is to show how to correct imperfect posture. The second object of my invention is accomplished by placing the device or posture man in bad posture, namely, with the head forward, the chest slumped, thereby causing dorsal curvature, the stomach out, thereby thrusting the pelvis forward in front and up in the back, the knees hyper-extending and the weight back upon the heels. Having placed the device or posture man in such incorrect posture, the structure demonstrates, by moving the parts of the figure, how this incorrect posture may be corrected. This is done by raising the head, drawing the chin in, raising the chest, pulling the stomach in and bending the knees very slightly, so that they are not stiff. It is then found that the weight is a little forward, and that the device or posture man is in a correct posture, as in the first demonstration. It will be observed that the principles involved in correcting the human body are precisely the same as those involved in correcting the position of the posture man, and therefore the educational value of such device or posture man is evident.

The device, broadly speaking, is a figure in outline approaching that of the human body and made of a number of parts so jointed together that said parts may be swung or shifted relatively to each other so as to bring the parts of the head and body into correct and incorrect postures for inspection and demonstration by visualized comparison.

In that particular form or embodiment of my invention herein disclosed, I have provided a head 1, which, by means of a suitable pin, rivet or other fastener 2, preferably metallic, is secured at the proper position to a piece 3. The piece 3 includes the neck and chest or upper portion of the body. Said piece 3 preferably extends downward sufficiently to include the region of the floating ribs. The said piece 3 is itself hinged or pivotally connected at 4 to a piece 5 corresponding to the entire trunk portion of the body, so that the lower part of the piece 3 may be brought into perfect alignment with the upper portion of the piece 5 to demonstrate or visualize correct posture, or it may be swung either way with respect thereto to visualize incorrect posture, as, for example, backward, as in Fig. 2, thus showing dorsal curvature, as at 6. The upper arm 7 is preferably pivoted at the same point 4 as is the piece or member 3. The lower arm 8 is pivoted at 9, so that the upper and lower arm portion may be swung into any position. Pivotally secured at 10 of the trunk piece or torso 5 is provided a lower body portion 11, which includes the stomach, abdomen and pelvis of the body, so that when swung forward into the incorrect posture position, shown in Fig. 2, the stomach, abdomen and pelvis are thrust out and forward, and the pelvis is somewhat elevated in the back.

At the lower portion of the lower body portion 11 is pivotally secured at 12 the upper leg portion 13, and at the lower portion thereof is pivoted at 14 the lower leg and foot portion 15. It is evident when the figure or posture man is in the correct position, Fig. 1, it is of a greater length or height than when in the incorrect posture position of Fig. 2.

The figure may be made of any suitable material, such, for example, as cardboard, composition or light sheet metal. Preferably, however, I employ cardboard. It is also evident that whereas I have shown but one arm and one leg, in other embodiments of my invention two arms and two legs constructed as herein disclosed may be provided, particularly in cases where like trunk pieces 5 are provided having located between them the upper and lower members 3 and body portion 11.

The educational device of my invention may be employed for instruction of classes or individuals, in schools, at the home, and elsewhere. Obviously and within the scope and purpose of my invention, the several pieces which make up the device or so-called posture man, especially when made of cardboard as hereinbefore stated, may be sold as a card-board or like sheet having all the pieces outlined or marked thereon in full size and with the pivotal points marked and all of the pieces identified, so that the purchaser of such card-board or the like may cut out the pieces and join them together at the indicated pivotal points, as herein described. Obviously the precise points at which the various pieces are pivotally connected together may be varied within the scope and purpose of my invention, so long as the object of the invention is retained, namely, the relative movement of the several pieces so as to bring the entire form into perfect posture or into incorrect posture for purpose of visual comparison and instruction.

Having thus described one embodiment of the article of my invention and the best mode known to me for carrying out the art or system comprehended within the scope of my invention, I desire it to be understood that although specific terms are employed, they are used in a generic and descriptive sense and not for purposes of limitation, the scope of the invention being set forth in the following claims.

1. An educational device or so-called posture man consisting of a series of substantially flat pieces, together representing in side view the contour of the human form, and pivotally connected together, so that each may be moved relatively to the others, thereby to bring the entire form into perfect posture and also to bring the form or portions thereof into incorrect posture for purpose of visual comparison and instruction, said pieces including an upper body portion to which a head is secured, said upper body portion being shaped to simulate the upper portion of the back and the chest, said portion when thrown into one position advancing the chest and when thrown into another position causing the chest to recede and rounding the back.

2. An educational device or so-called posture man consisting of a series of substantially flat pieces, together representing in side view the contour of the human form, said pieces including a head, an upper body portion, a trunk portion and a lower body portion, all movably connected together so that each may be moved relatively to the others, thereby to bring the form or portions thereof into incorrect posture for purpose of visual comparison and instruction, said upper body portion being shaped to simulate the upper portion of the back and the chest, said portion when thrown into one position advancing the chest and when thrown into another position causing the chest to recede and rounding the back.

3. An educational device or so-called posture man consisting of a series of substantially flat pieces, together representing in side view the contour of the human form, said pieces including a head portion, an upper body portion, a trunk portion, a lower body portion and upper and lower limbs, all movably connected together, so that each may be moved relatively to the others, thereby to bring the form or portions thereof into incorrect posture for purpose of visual comparison and instruction, said upper body portion being shaped to simulate the upper portion of the back and the chest, said portion when thrown into one position advancing the chest, and when thrown into another position causing the chest to recede and rounding the back, and the lower body portion being shaped to simulate the abdominal region and the lower part of the back, said portion when thrown into one position withdrawing the abdominal portion, and when thrown into another position advancing the abdominal portion.

4. An educational device or so-called posture man consisting of a series of substantially flat pieces, together representing in side view the contour of the human form, said pieces including a head, an upper body portion to which the head is pivotally attached and a trunk portion to which said upper body portion is pivotally attached, said upper body portion having a chest edge and a back edge and pivotally connected to the trunk portion for relative swinging movement flatwise of each other whereby the parts may be relatively moved so as to illustrate perfect posture when in one position and when in another to simulate the bad posture known as dorsal curvature.

5. An educational device or so-called posture man consisting of a series of substantially flat pieces, together representing in side view the contour of the human form, said pieces including a trunk portion and a lower body portion, the latter having a front or stomach edge and a back or pelvis edge, said pieces being pivotally connected, for flatwise swinging movement, whereby they may be moved to demonstrate perfect posture or may be moved to thrust the stomach or abdomen and pelvis portion forward and the pelvis portion upward at the rear, said lower body portion having a front edge simulating the abdominal area which, when thrown into one position protrudes, and which, when thrown into another position, is withdrawn.

6. An educational device or so-called posture man consisting of a series of substantially flat pieces, together representing in side view the contour of the human form, said pieces including an upper body portion, a trunk portion and lower body portion, and said upper body portion and lower body portion being pivoted to the trunk portion for relative flatwise swinging movement, whereby they may be swung into position to demonstrate perfect posture and also into contrasting position to demonstrate dorsal curvature and protrusion of the abdomen and pelvis.

7. An educational device or so-called posture man consisting of a series of substantially flat pieces, together representing in side view the contour of the human form, said pieces including a head piece 1, upper body portion 3, trunk portion 5, a lower body portion 11 and arm and leg members having pivotal connection to said trunk portion and shaped substantially as herein shown for the purpose of demonstrating correct and incorrect postures, said upper body portion 3 having a front edge simulating the chest and a rear edge simulating the back to be thrown respectively into two positions, and the lower body portion 11 having a front edge simulating the abdominal region.

8. An educational device or so-called posture man as a separate article of manufacture consisting of a series of substantially flat pieces together representing in side view the contour of the human form, said pieces consisting of a head, an upper body portion having a neck, to which the head is pivotally attached, a trunk portion to which said upper body portion is pivotally attached, said upper body portion having front and rear edges which when swung forward indicate an expanded chest position and when swung rearward indicate a round-shouldered position, a lower body portion pivoted to said trunk portion and having a front edge which when said lower body portion is swung forward indicates a typical posture, and a leg having a suitable pivotal connection.

9. An educational device or so-called posture man as a separate article of manufacture consisting of a series of substantially flat pieces together representing in side view the contour of the human form, said pieces consisting of a head, an upper body portion having a neck, to which the head is pivotally attached, a trunk portion to which said upper body portion is pivotally attached, said upper body portion having front and rear edges which when swung forward indicate an expanded chest position and when swung rearward indicate a round shouldered position, a lower body portion pivoted to said trunk portion and having a front edge which when swung forward indicates a typical position, and a leg pivotally connected to the lower part of the lower body portion, and an arm pivoted co-axially with said upper body portion.

10. For use as an educational device or so-called "posture man", a series of flat pieces which, when pivotally connected together at predetermined points, represent in side view the contour of the human form, the said pieces including a head piece 1, an upper body portion 3 to which in assembled position the said head piece 1 is pivoted for relative flatwise movement, a trunk portion 5 to which when in assembled position said upper body portion 3 is pivotally connected for flatwise movement, the lower body portion 11 to which when in assembled position the trunk portion 5 is pivotally connected for flatwise movement, arm members which when assembled are pivotally connected to said trunk portion 5 for flatwise movement, and leg members which when assembled are directly pivotally connected to said lower body portion 11 for flatwise movement, said pieces being shaped substantially as herein shown for the purpose of demonstrating correct and incorrect postures when assembled; said upper body portion 3 having a front edge simulating the chest and rear edge simulating the back, adapted, when assembled, to be thrown respectively into two positions, and the lower body portion 11 having a front edge simulating the abdominal region.

In testimony whereof, I have signed my name to this specification.

ELIZABETH DWIGHT.